United States Patent Office 3,494,938
Patented Feb. 10, 1970

---

3,494,938
PESTICIDAL COMPOUNDS
Edward D. Weil, Yonkers, and Paul E. Hoch, Youngstown, N.Y., assignors to Hooker Chemical Corporation, Niagara Falls, N.Y., a corporation of New York
No Drawing. Continuation-in-part of applications Ser. No. 327,519, Dec. 2, 1963, and Ser. No. 510,072, Nov. 26, 1965. This application May 19, 1966, Ser. No. 551,246
Int. Cl. C07d 5/04; A01m 9/28
U.S. Cl. 260—346.2                                    10 Claims

ABSTRACT OF THE DISCLOSURE

There are provided novel compounds of the formula

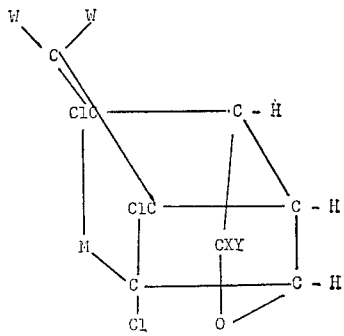

wherein X and Y are independently selected from the group consisting of chlorine and hydrogen, M is selected from the group consisting of carbonyl and hydroxymethylene, and W independently is selected from the group consisting of bromine, fluorine, chlorine and monochloroalkyl of from 1 to 2 carbon atoms. The compounds of this invention are insecticidal, being especially effective against houseflies and lepidopterous larvae.

---

This application is a continuation-in-part of Ser. No. 510,072, filed Nov. 26, 1965, now U.S. Patent 3,322,622, and of Ser. No. 327,519, filed Dec. 2, 1963, now U.S. Patent 3,331,860.

This invention relates to new and useful pesticidal compounds, said compounds having the general formula:

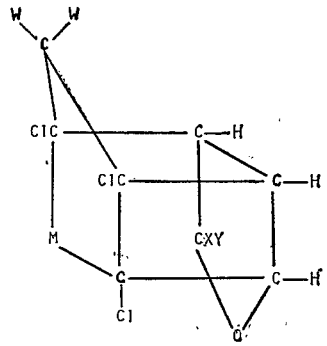

wherein X and Y are selected from the group consisting of hydrogen and chlorine, M is selected from the group consisting of carbonyl ($>C=O$) and hydroxymethylene ($>CHOH$) radicals, and W is independently selected from the group consisting of bromine, alkyl, fluorine, chlorine, and bromo-, fluoro- and chloroalkyls, wherein the alkyl group is of 1 to 5 carbon atoms. The following compounds, e.g., are thus within the scope of this invention:

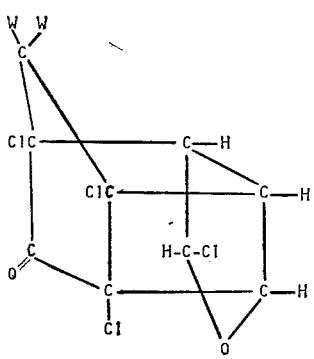

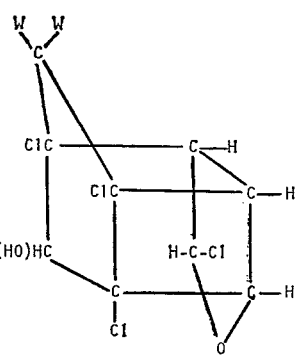

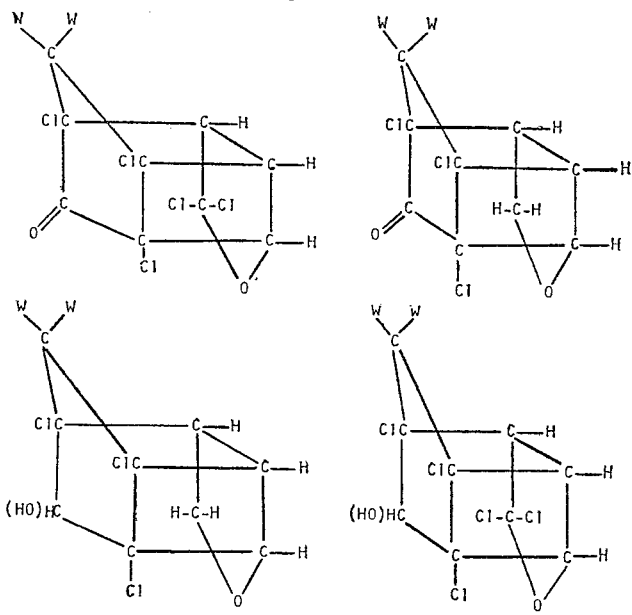

At least one of the W's must be halogen.

When M is carbonyl, these compounds are prepared by dehydrochlorinating precursor compounds of the formula:

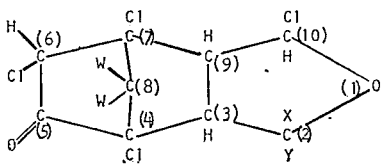

At least one of the W's in said precursor may be a halogen. Dehydrochlorination occurs by a mechanism wherein the acidic proton on carbon number 6 ionizes, the chlorine atom on carbon number 10 is released as an ion, and the chloride ion is solvated, or complexed with a Lewis acid. The situations in which reaction conditions favor ionization of the acidic proton and attachment of the chloride ion to a Lewis acid are surprisingly diverse, and may exist when the precursor compounds are subjected to water, to bases, and to Lewis acids (including surface active dehydrochlorinating catalysts of the Lewis acid type). The inventors, for example, found that favorable reaction conditions exist when:

(a) The precursor compound, in finely dispersed form, is contacted with water;

(b) The precursor compound, in finely dispersed form, is contacted with an aqueous base;

(c) The precursor compound is contacted with a miscible base, such as an organic amine;

(d) The precursor compound is contacted with a Lewis acid, such as ferric chloride, in a homogeneous medium;

(e) The precursor compound is contacted with a solid Lewis acid of high surface area, such as silica gel or alumina;

(f) The precursor compound is contacted with a solid amphoteric substance which has both Lewis acid and Lewis base sites, such as any of various natural clays.

Conditions which favor cleavage are to be avoided. For example, if strong bases, such as alkali metal hydroxides, are used, the bond between carbon number 5 and carbon number 6 will be cleaved. Also to be avoided are conditions which favor hydrolysis. For example, if the precursor compound is subjected to a substantially equimolar (or greater) amount of water in a homogeneous medium (which acts as a cosolvent for both the precursor compound and the water), a competing hydrolytic reaction occurs, yielding a by-product wherein one chlorine atom has been replaced by a hydroxy group.

Where M is hydroxymethylene, these compounds are most conveniently prepared by metal hydride reduction of the related compounds wherein M is carbonyl. Suitable metal hydrides include, for example, lithium aluminum hydride and sodium borohydride. Where more than a molar equivalent of the hydride is used, it is possible not only to convert the carbonyl to a hydroxymethylene group but to convert X and Y, when either or both are chlorine, to hydrogen. The reduction is carried out by contacting the reagents in a liquid phase, most commonly in solutions of ether, tetrahydrofuran, or dioxane, or in hydrocarbon suspensions.

The compounds of this invention are extremely active insecticides, being among the most active yet discovered against such insects as houseflies and lepidopterous larvae. They are also highly effective rodenticides, and are toxic to nematodes, slugs, snails, marine animal pests such as drills and barnacles, and to animal pests in general. They may be employed in the pure state, but are most advantageously formulated with solvents, carriers, surfactants, and other adjuvants.

An advantage of the products of this invention is that they may be utilized in a wide variety of insecticidal formulations, generally in a proportion of 0.5 to 1000 parts by weight to about 1 to 1000 parts by weight of other insecticides. It is, of course, appreciated that various effective amounts of the compounds of this invention can be utilized, and the application rates will often be dependent on the particular circumstances. For example, the purified or crude products may be combined with other biocides or pesticides, including insecticides, such as DDT, methoxychlor, lindane, aldrin, endrin, DDD, BHC, parathion, malathion, methyl parathion, lead arsenate, calcium arsenate, rotenone, allethrin, pyrethrum, nicotine, summer oils, dormant oils, dinitroalkylphenols, dinitrocresols, chlordane, heptachlor, insecticidal carbamates and organophosphates; chlorinated terpenes, demeton, thiophosphates and dithiophosphates such as O,O-dimethyl S oxo-1,2,3-benzotriazin-3(4H)-ylmethylphosphorodithioate; O,O - diethyl-O(2-isopropyl-6-methyl-4-pyrimidinyl) phosphorothioate; dimethyl 2,2-dichlorovinyl phosphate; miticides such as bis(pentachlorocyclopentadienyl), chlorinated arylsulfonates, chlorinated diarylsulfones and the like; and fungicides such as sulfur, dithiocarbamates and N-trichloromethylthio-4-cyclohexene-1,2-dicarboximide, to list but a few. Other insecticides with which the compounds of the invention may be employed are those listed by Kenaga, Bull. Ent. Soc. of America, 9, 69 ff (1963).

It may also be desirable to combine the insecticidal products of this invention with a class of potentiators or synergists known in the insecticidal art as "knockdown agents," although against most insects the compounds of the present invention possess an excellent rate of action by themselves. Among the large number of synergists and "knockdown agents" which may be used for this purpose are the organic thiocyanates and others listed by Kenaga (Loc. cit., pg. 69, 70, 92). Other adjuvants useful with the compounds of the invention include odorants, colorants, stabilizers, and extending agents (vapor pressure depressants and nonvolatile solvent substances such as chlorinated waxes, resins, and the like).

Another advantage of the inventive compositions is that they may readily be formulated as solids or liquids, using solid or liquid solvent vehicles, carriers, or extenders. Suitable diluents are solids or liquids of an inert nature. Illustrative solid diluents include among many others: sawdust, vermiculite, clay, talcs, flours, silicas, alkaline earth carbonates, oxides and phosphates, solid fertilizer, and the like. Suitable solvents for liquid formulations include ketones, aromatic and aliphatic hydrocarbons, and petroleum fractions or distillates such as xylenes, aromatic naphthas, and the like.

Whether dissolved or dispersed, suspended or emulsified in a liquid, or formulated as a dust or powder or as some other solid preparation, the insecticides of this invention may advantageously contain one or more substances known or referred to variously as modifiers, wetting agents, or surface-active agents. Suitable agents are alkylaryl sulfonates, polyoxyethylene polyol ethers and esters, and the like.

The compounds of the invention can also be formulated in bait compositions, for example, with fatty, sugary, or proteinaceous ingestible bait substances.

For controlling pests the compounds of the present invention are applied in insecticidal quantities or effective amounts onto the site of the existing or anticipated harmful pests. Effective insecticidal concentrations are in the range of from about 0.01 pound per acre to about 20 pounds per acre. In most crop applications, rates of 0.05 to 5 pounds per acre are employed. Lower rates are used very susceptible species, such as mosquito larvae, while higher rates are used on extremely resistant species. Higher rates than 20 pounds per acre may be used where economical.

The rate to be used will depend on many variables such as the insect species, duration of control desired, weather, soil type, crop species, timing between application and harvest, economics, and other factors known to one of skill in this art. The application of the insecticide may be to the crop itself or to the soil in which it is grown.

In the specification, examples, and claims, parts are by weight and temperatures are in degrees centigrade, unless otherwise indicated.

In order that those skilled in the art may better understand the present invention and the manner in which it may be practiced, the following illustrative examples are given.

EXAMPLE 1

A solution of 400 parts of sodium hydroxide in 2500 parts of methyl alcohol was heated to reflux with stirring, and 800 parts of 5,6-di(hydroxymethyl)-1,2,3,4,7,7-hexachlorobicyclo[2.2.1]hept-2-ene (the Diels-Alder adduct of cis-2-butene - 1,4 - diol and hexachlorocyclopentadiene) were added over a two-hour period. The suspension was refluxed and stirred for an additional two hours. Then, two-thirds of the methanol was permitted to distill off. The remaining slurry was poured into three times its volume of water, causing the inorganic salts to dissolve and the organic product to precipitate. The product was filtered, washed with water, and dried in an oven to obtain a substantially theoretical yield of the crude product having elemental analysis and spectroscopic properties for

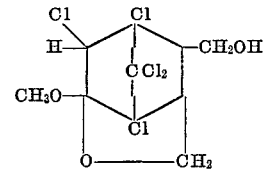

Recrystallization of this crude product from hot carbon tetrachloride yielded a pure product, with a melting point of 157 to 158 degrees centigrade.

To 6800 parts of concentrated (97%) sulfuric acid at 93 to 95 degrees centigrade were added with stirring 750 parts of the product formed above. The mixture was heated at 95 degrees centigrade for 5 hours and then cooled to room temperature. The solution was poured slowly into cold water with stirring. The precipitated solid was filtered out, washed with water, and dried to obtain a gray solid in 89.5 percent of the theoretical yield. The material, a mixture of isomers, had a melting point in the vicinity of 198–204 degrees centigrade. It had the correct elemental analysis for $C_9H_7O_2Cl_5$. The infrared spectrum shows a strong ether band at 1060 centimeters$^{-1}$, a ketone carbonyl band at 1785 centimeters$^{-1}$, a methylene carbon-hydrogen band at 1480 centimeters$^{-1}$, and no hydroxy bands. The structure is therefore:

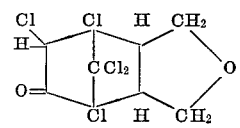

The tricyclic ketone produced was resolved into two isomers by the following procedure. 611 parts of the product were recrystallized from 2000 parts of ethanol. The solids were then recrystallized from carbon tetrachloride to obtain one of the stereo-isomers, melting point 196 degrees centigrade to 195 degrees centigrade. This isomer is distinguishable from the other described below by the fact that the former possesses an infrared absorption band at 12.1µ, whereas the latter possesses, instead, an absorption band at 12.4µ (observed in Nujol mull). These isomers of $C_9H_7O_2Cl_5$ are hereinafter designated the "12.1µ isomer" and the "12.4µ isomer." They are stereo-isomeric at the carbon, designated as 6, but this application is not intended to be limited by this theory.

The second stereoisomer, the "12.4µ isomer" was obtained by collecting a second crop of crystals by cooling and partial evaporation of the ethanol mother liquor from the above-described crystallization, and then recrystallizing this substance several times from heptane. This "12.4µ isomer" has a melting point of about 217–220 degrees centigrade, which is somewhat variable due to decomposition which appears to be promoted by traces of impurities. Both isomers have the correct percentage of chlorine (54.7%) for $C_9H_7O_2Cl_5$ and exhibit an ether >C—O— in the infrared spectrum and a C=O bond (ketone), but no O—H bonds.

164 parts of the "12.4µ isomer" from the crude $C_9H_7O_2Cl_5$ were dissolved in 300 parts of refluxing carbon tetrachloride, the solution was exposed to the light from a mercury vapor lamp, and chlorine gas was passed in with stirring. The extent of the chlorination was measured by collecting the evolved hydrogen chloride in water and by titrating the hydrochloric acid from time to time. The reaction was stopped when two moles of hydrogen chloride had been collected per mole of $C_9H_7O_2Cl_5$ in the system. The product was a yellowish semi-solid which, on repeated recrystallization from hexane, yielded a crystalline isomer melting at 129.5–131.5 degrees centigrade and being of the correct elemental analysis for $C_9H_5O_2Cl_7$. The absence of methylene group absorption bands in the infrared spectrum shows that this compound has the structure:

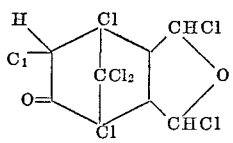

In a similar manner, dichlorination of the "12.1μ isomer" of $C_9H_7O_2Cl_5$ yielded an isomeric $C_9H_5O_2Cl_7$ of melting point 91–2° C. after recrystallizaiton from hexane.

3.9 parts of the $C_9H_5O_2Cl_7$ thus prepared (either isomer, or a mixture thereof) was dissolved in 50 cubic centimeters of ether. This solution was stirred vigorously with a buffer solution (pH 8) consisting of 900 cubic centimeters of 0.1 molar boric acid and 100 cubic centimeters of 0.1 normal sodium hydroxide, until Volhard titration of a small aliquot portion showed that substantially 1 molar equivalent of chlorine ion had been evolved per mole of $C_9H_5O_2Cl_7$. This reaction, under ambient conditions took about 41 hours. The ether was allowed to evaporate as the reaction mixture continued to be stirred, and the resultant solid precipitate was then removed by filtration to obtain 3.1 parts of colorless crystals, with a melting point of 134–134.5 degrees centigrade. Recrystallization of this product from hexane raised the melting point to 137–138 degrees centigrade., The infrared spectrum of the product showed a strained ketonic carbonyl band at 1803 centimeters$^{-1}$ (in carbon disulfide solution), an absence of —C=C— bands, an absence of —OH bands, and the presence of C—O— bonds. The nuclear magnetic resonance spectrum (in deuterochloform) showed four protons, a singlet at 6.15, a quadruplet centered at about 4.95 (J=7 and about 1.5), a triplet (degenerate quadruplet, J=7 and 1 (centered at 4.25, and a quadruplet at about 3.85 (J=7 and about 1.5 parts per million relative to tetramethylsilane.

The $C_9H_4O_2Cl_6$ formed had a theoretical molecular weight of 357, and a theoretical composition of 30.3% carbon, 1.12% hydrogen, and 59.6% chlorine. Analysis of the product indicated a molecular weight of 344, and a composition of 30.3% carbon, 1.21% hydrogen, and 59.6% chlorine.

The same product was also obtained by conducting the reaction in the aforementioned fashion, but using in place of the aqueous borate buffer a series of phosphate and citrate buffers of pH's of from 4 to 10.

The analytical data, infrared spectrum, and nuclear magnetic resonance spectrum establish the structure of the product as

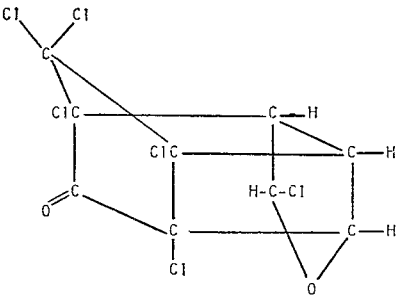

EXAMPLE 2

2 parts of $C_9H_5O_2Cl_7$ prepared as in Example 1, were dissolved in 10 parts of xylene and the solution was emulsified in 2000 parts of water with 2 parts of a commercial alkyl acid phosphate emulsifier. The emulsion was stirred and aliquot portions were periodically titrated to determine how much HCl was present. When one molar equivalent of hydroloric acid per mole of $C_9H_5O_2Cl_7$ had been released (this took about a day under ambient conditions), the mixture was extracted with methylene chloride. The methylene chloride was then evaporated, leaving a residue of solid product. Upon infrared analysis, said product was found to be $C_9H_4O_2Cl_6$, identical to the product formed in Example 1.

In the absence of emulsifier the reaction proceeded much more slowly, giving only 15% conversion in two days under ambient conditions.

A solution of 5 parts of $C_9H_5O_2Cl_7$, prepared as in Example 1, was added to 280 parts of silica gel (which has been activated by heating it at 130 degrees centigrade for 90 minutes) and allowed to stand overnight at room temperatures. The organic product was extracted with carbon disulfide. Infrared analysis showed that it consisted of a mixture of $C_9H_4O_2Cl_6$ (identical to the final product formed in Example 1) and undehydrochlorinated $C_9H_5O_2Cl_7$.

Similar results were obtained using activated alumina or activated Attapulgus clay (fuller's earth, attapulgite) in place of silica gel.

EXAMPLE 3

164 parts of $C_9H_7O_2Cl_5$ (mixed isomers), prepared as in Example 1, were dissolved in 300 parts of refluxing carbon tetrachloride, the solution was exposed to the light from a mercury vapor lamp, and chlorine gas was passed in with stirring. The extent of the chlorination was measured by collecting the evolved hydrogen chloride in water and by titrating the hydrochloric acid from time to time. When 1, 2, 2½, 3 and 4 moles of hydrogen chloride were collected per mole of $C_9H_7O_2Cl_5$ (corresponding to 1, 2, 2½, 3 and 4 chlorine atoms introduced per mole, respectively), portions of the reaction mixture were removed and evaporated under 15 to 25 millimeters to remove solvent and dissolved gases. The products obtained as residues had the following characteristics:

| Number of chlorine atoms introduced per mole | Percent chlorine theoretical | Percent chlorine found | Physical characteristics |
|---|---|---|---|
| 1 | 59.3 | 58.2 | Yellowish-tan semi-solid. |
| 2 | 63.1 | 63.0 | Do. |
| 2.5 | 64.8 | 64.8 | Do. |
| 3 | 66.4 | 66.5 | Do. |
| 4 | 68.2 | 67.5 | Do. |

The mono-substituted product, of the formula:

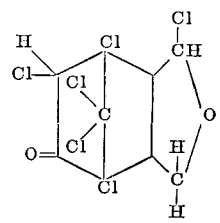

was dissolved and emulsified in the manner described in Example 2. The emulsion was stirred until one molar equivalent of hydrochloric acid was released, to obtain:

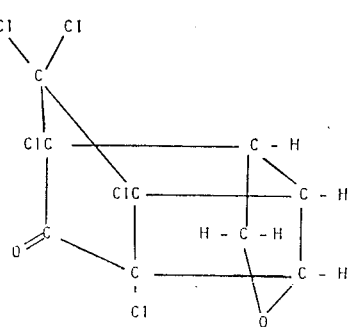

a colorless crystalline solid.

EXAMPLE 4

The tri-substituted product prepared in Example 3, of the formula:

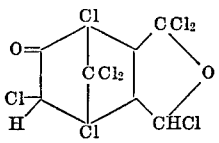

was dissolved and emulsified in the manner described in Example 2. The emulsion was stirred until one molar equivalent of hydrochloric acid was released, to obtain

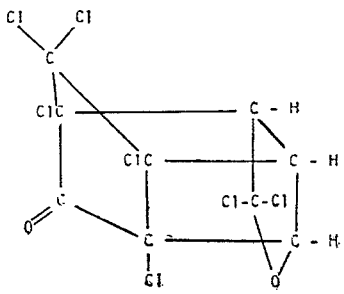

EXAMPLE 5

A solution of 5 parts of the final product of Example 1 (of formula $C_9H_4O_2Cl_6$), one part of lithium aluminum hydride, and 275 parts of ethyl ether were refluxed overnight. The mixture was then filtered, the filtrate was evaporated, and the residue was then recrystallized three times from cyclohexane. 2.3 parts of a colorless crystalline solid, of melting point 153–154 degrees centigrade, were obtained. The infrared spectrum indicated that no carbonyl groups were present and that a hydroxy group was present. The nuclear magnetic resonance spectrum (run in deuterochloroform) showed six protons, as follows: one proton as a singlet at 6.3, one proton as a quadruplet at 5 (J=5 and 2.8), one proton as a doublet at approximately 4.2 (J=10), two protons as overlapping doublets at 3.8 (J=2.8) and about 3.7 (J=5), and one proton as a doublet at 2.9 (J=9) parts per million relative to tetramethylsilane. The doublet at 2.9 vanished and the doublet at 4.2 collapsed to a singlet when deuterium oxide was added, proving that these bands were due to the hydroxyl proton and the carbon bonded proton of the hydroxymethylene group, respectively.

The product had a theoretical chlorine content of 59.3%. Analysis showed a chlorine content of 59.1%.

These data show that the product is

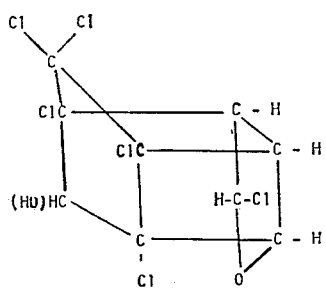

EXAMPLE 6

Five parts of the final product of Example 1 and two parts of lithium aluminum hydride were dissolved in 500 parts of ether. The mixture was refluxed under nitrogen for five days. Then three parts of water were slowly added, and, when the excess hydride had finished reacting, magnesium sulfate (drying agent) was added and the mixture was filtered. The filtrate was stripped free of ether, and the residue was recrystallized from cyclohexane and benzene, and then from aqueous isopropanol. The product obtained had a constant melting point of 226–227 degrees centigrade. The nuclear magnetic resonance spectrum (in deuterochloroform) showed a total of 7 protons, two of which (doublets at 4.3 and 3.0, converted to singlet and deleted, respectively, by deuterium oxide addition) established the presence of hydroxymethylene group. The absence of the singlet at 6.3 and the appearance of a multiplet at about 4.1, integrating to two protons, establishes that the —CHCl—O— structure has become reduced to —$CH_2$—O—. Therefore, the product is:

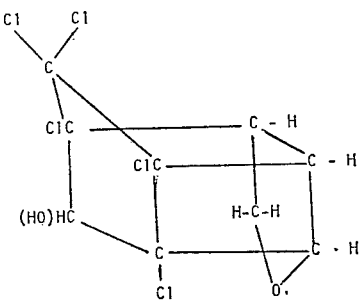

EXAMPLE 7

An emulsifiable formulation is prepared by admixing the following:

| | Parts |
|---|---|
| Final product of Example 1 | 12.5 |
| Gafac RE610 (alkyl acid phosphate emulsifier) | 5 |
| Xylene | 4.25 |

The resultant solution, emulsified with water at the rate of about ¼–½ parts of concentrate per 100 parts of water, and applied to cabbage, results in control of cabbage loopers and aphids.

EXAMPLE 8

A wettable powder formulation is prepared by grinding together the following ingredients:

| | Parts |
|---|---|
| Product of Example 4 | 10 |
| Sorbit P | 1 |
| Marasperse N | 2 |
| Microcel E | 7 |

The resultant formulation is dispersed in 50 gallons of water and applied at the rate of ½ pound of active ingredient per acre to an alfalfa field, resulting in alfalfa weevil control.

EXAMPLE 9

A 5% granular formulation is prepared by impregnating 19 parts of granular 15/30 mesh attapalgus clay with 1 part of the product of Example 1 (admixed with lesser amounts of the products of Examples 4 and 5) which was dissolved in acetate solution, and drying the granules thereafter. Ten pounds per acre of this formulation are applied to a cornfield, and this controls corn rootworms.

EXAMPLE 10

Houseflies (*Musca domestica*) were sprayed wtih solution made up of 8 parts of product of Example 1 per million parts of water, and the flies were observed for toxic effects. At two hours after spraying 100% of the flies were prostrate, and at 24 hours after spraying 100% of the flies were dead.

The same result was obtained when the product of Example 6 was used instead of that from Example 1.

Similar results are obtainable when W=$CH_2Cl$, $C_2H_4Cl$, Br, F, $CH_3O$ although these compounds are not as toxic as those wherein W=Cl.

EXAMPLE 11

Bean plants were sprayed with solutions comprised of 15 parts of the products of Examples 1, 4, 5 and 6, per million parts of aqueous solvent. The deposits were allowed to dry, and then larvae of the Southern army worm were placed on the treated plants, and on similar control plants which had not been treated. When observed 24 hours later each of the larvae on the treated plants had died, and almost none of the foliage of these plants had been consumed, whereas the larvae on the control plants were alive and were producing extensive foliar damage.

What is claimed is:

1. A compound of the structure

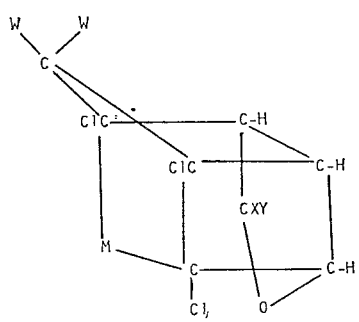

wherein X and Y are independently selected from the group consisting of chlorine and hydrogen, M is selected from the group consisting of carbonyl and hydroxymethylene, and W independently is selected from the group consisting of bromine, fluorine, chlorine, and mono-chloroalkyl of from 1 to 2 carbon atoms.

2. The compound of claim 1, wherein W is chlorine.
3. The compound of claim 2 wherein M is carbonyl.
4. The compound of claim 3 wherein both X and Y are hydrogen.
5. The compound of claim 3 wherein both X and Y are chlorine.
6. The compound of claim 3 wherein X is hydrogen and Y is chlorine.
7. The compound of claim 1 wherein M is hydroxymethylene.
8. The compound of claim 7 wherein both X and Y are hydrogen.
9. The compound of claim 7 wherein both X and Y are chlorine.
10. The compound of claim 7 wherein X is hydrogen and Y is chlorine.

References Cited

UNITED STATES PATENTS 3,331,860  7/1967  Hoch _____ 260—376.2

ALEX MAZEL, Primary Examiner

B. I. DENTZ, Assistant Examiner

U.S. Cl. X.R.
424—285

PO-1050
(5/69)

UNITED STATES PATENT OFFICE
CERTIFICATE OF CORRECTION

Patent No. 3,494,938              Dated February 10, 1970

Inventor(s)          Edward D. Weil et al.

It is certified that error appears in the above-identified patent and that said Letters Patent are hereby corrected as shown below:

Column 5, line 44, "used very susceptible" should read -- used on very susceptible --. Column 6, line 53, "partial" should read -- partical -- Column 7, line 3, that portion of the formula reading

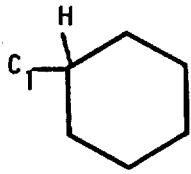     should read --     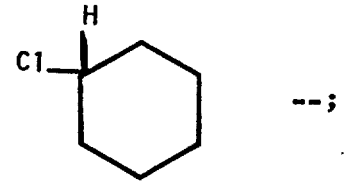     --;

column 7, line 13, "recrystallizaiton" should read -- recrystallization --; column 7, line 21, "chlorine" should read -- chloride --; column 7, line 38, "(J=7 and about 1.5" should read -- (J= 7 and about 1.5) --; column 7, line 73, "hydroloric" should read -- hydrochloric --. Column 9, line 42, "3.7" should read -- 3.75 --. Column 10, line 60, "wtih" should read -- with --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents